Aug. 11, 1925.

J. J. KANE 1,549,005

ELECTRIC POWER SYSTEM

Original Filed Feb. 2, 1920   2 Sheets-Sheet 1

Inventor
J. J. Kane
by
Attorney

Aug. 11, 1925.

J. J. KANE 1,549,005

ELECTRIC POWER SYSTEM

Original Filed Feb. 2, 1920   2 Sheets-Sheet 2

Inventor
J. J. Kane
by
Attorney

Patented Aug. 11, 1925.

1,549,005

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTRIC POWER SYSTEM.

Application filed February 2, 1920, Serial No. 356,181. Renewed October 12, 1923.

*To all whom it may concern:*

Be it known that JOHN J. KANE, a citizen of the United States of America, residing at Milwaukee, in the county of Milwaukee and State of Wisconsin, has invented a certain new and useful Improvement in Electric Power Systems, of which the following is a specification.

This invention relates in general to electrical power and distribution systems, and has particular relation to devices or apparatus for regulating generators driven by prime movers, such as engines or turbines, and connected to supply variable loads, especially where there is a tendency for the generator driving means to operate at a speed dependent upon the load.

In certain installations, as where a steam turbine drives a generator, usually through a direct connection therewith, for supplying a variable electrical load, such as lights on a railroad train or the locomotive thereof, some means are desirable for regulating or limiting the speed of the turbine on the loss of a portion of the generator load, and also on an appreciable increase in the steam pressure at the turbine inlet. It will be obvious that, if the generator were permitted to operate at an increased speed on the removal of a portion of its normal load or on an increase in pressure at the inlet of the turbine, the voltage on the lamps or other translating devices constituting the load on the generator might rise to a dangerously high value, and this is especially the case where the load comprises lamps of the incandescent type, where a voltage variation of less than 10% may be highly injurious to the life of the lamps.
Any of the prior art systems of control, involving the adjustment of a controlling valve at the inlet of the prime mover in response to a characteristic of the energy supplied by the generator driven by the prime mover, is, at most, of only limited application in the control of a prime mover of the character described above, wherein there is an extreme tendency to run away upon the removal of load from the generator, and this is especially the case with small turbine-driven sets such as find their greatest present utility in furnishing power for locomotive lights.

In accordance with the present invention, improved means are provided for regulating the output of the generator automatically in response to an operating characteristic of the generator, the general operating effect of the regulating means being to maintain a characteristic, such as the voltage, of the energy supplied by the generator, substantially constant independently of any tendency of the prime mover driving the generator to operate at a variable speed dependent upon the load on the generator. The invention includes the utilization of this automatically responsive means to vary the opening of a normally open throttle in the inlet to the prime mover. This latter feature, the normally open throttle, is of considerable utility as an element of the invention, for it is extremely desirable that once having opened the inlet to the turbine by means of a hand valve, ordinarily located in the cab of a locomotive, it is desirable that the maximum pressure and amount of working fluid be admitted to the turbine so as to bring the latter up to normal speed as quickly as possible independently of the amount of load that may have been put upon the generator prior to the latter attaining normal speed and voltage.

It is an object of this invention to provide a system embodying improved means for regulating a generator connected to supply a variable load.

It is an object of this invention to provide improved regulating means for a system comprising a generator driven by a prime mover having an inherent tendency to increase its speed on loss of load, the regulating means being operative to maintain substantially constant an operating characteristic of the energy supplied by the generator independently of the load thereon, and wherein a characteristic of the working fluid admitted to the prime mover is automatically caused to vary in response to variations in a characteristic of the generator.

It is a further object of this invention to provide improved regulating means for varying the supply of working fluid to the turbine of the set in a system of the character described, wherein the regulating means are automatically responsive to a characteristic of the electrical load on the generator of the set and the pressure of the working fluid at the turbine inlet.

It is a further object of this invention to provide improved regulating means for a system of the character described wherein an electromagnetic element differentially responsive to the current and voltage of the generator of the set is utilized for causing variation in the supply of working fluid admitted to the engine of the set.

It is a further object of this invention to provide an improved regulating apparatus for a system of the character described wherein an electromagnetic device differentially responsive to the current and voltage of the generator of the set is utilized for causing the supply of working fluid to the engine or turbine to vary in response to the electrical load on the generator, while permitting admission of a maximum or desired amount of working fluid to the turbine during the starting of the same independently of the load upon the generator during such starting period.

These and other objects are attained by this invention, the various novel features of which will appear from the description and drawings, disclosing one or more embodiments of the invention, and will be particularly pointed out in the claims.

Figure 1:
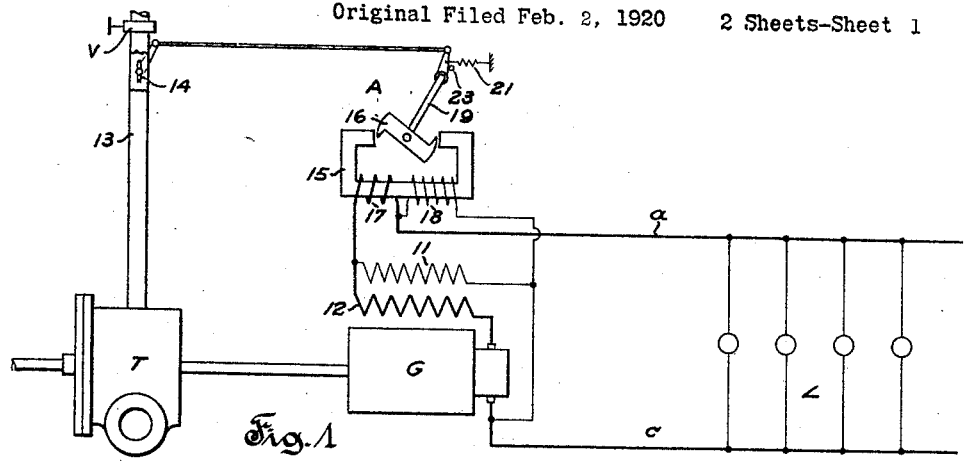
Fig. 1 is a diagrammatic view of a system embodying features of this invention.

In the system disclosed diagrammatically in Fig. 1, a generator G, shown diagrammatically, is driven by a prime mover, such as a turbine T, being preferably mounted upon the same shaft therewith. The shunt field of the generator is indicated at 11 and the series field at 12, the machine terminals being properly connected to the distribution circuit $a$, $c$, which supplies energy to a variable load, indicated at L. The turbine T is provided with an inlet 13, and there may be located therein valve means V of any suitable and desired character for permitting an operator to regulate at will the amount of working fluid admitted to the turbine or the pressure of such working fluid. This regulating or controlling means is disposed in a position readily accessible to an operator, such as the cab of a locomotive, and a second regulating or controlling means is provided in the turbine inlet 13, preferably adjacent the turbine, itself, this regulating means being indicated as an inlet controlling valve 14 which, for purposes of description, may best be considered as of the butterfly type, although a needle or other type of valve might be more suitable in actual operation.

Means for actuating the inlet valve 14, here shown in its full open position, so as to variably close or throttle the inlet, is indicated generally at A. The actuating device here shown comprises an electro-magnet having a stationary magnetizable or field element 15 and a movable element 16 adapted to be moved into position wherein it effectively bridges a gap between polar portions of the fixed element 15. The magnetic device is energized by a winding 17 in series with the distribution circuit $a$, $c$ and a second winding 18 in shunt to such distribution circuit. These windings are of such design and so disposed in a differential arrangement as to exert equal and opposite magnetizing effects upon the member 15, when the load upon the generator G, this load being indicated by the lamps L, is normal or maximum. The movable magnetic element 16 is fixedly mounted upon the shaft 19 which is mechanically connected to the throttle valve 14 to actuate the latter on movement of the element 16. A spring 21, or equivalent means may be provided to bias the element 16 and the valve 14 to a position wherein the passage through the inlet 13 is open to maximum extent, a part of the operating mechanism being held at this time against a stop 23.

In the operation of the system, we may assume that the set is operating at normal speed and that maximum or normal load is upon the generator. At this time, the magnetizing effects of the windings 17 and 18 are equal and opposite, and hence no mechanical effect is exercised upon the throttle valve 14, the same being held in its normal full-open position, as by means of the spring 21. As increments of load are removed from the generator circuit, the ampere turns and magnetizing effect of the winding 17 are thereby decreased, and the magnetizing effect due to the winding 18 thus predominates to cause operation of the movable element 16 and the actuation of the valve 14, against the action of the spring 21, to an extent sufficient to reduce the amount of working fluid admitted to the turbine to a required degree, thus causing the turbine to operate at the normal and desired speed which produces normal voltage on the generator and the load connected thereto. It will be apparent that, as load continues to be removed from the generator, the magnetizing effect of the voltage coil 18 predominates to an increasing degree and causes closure of the valve 14 to its point of minimum opening, corresponding to that which permits the admission of only enough working fluid to cause the turbine T to operate at normal speed when there is no load on the generator.

In a corresponding manner, it will be apparent that, as increments of load are connected in the generator circuit, the effect of the voltage coil 18 is counteracted to a varying degree to permit opening of the valve 14 by the spring 21 to an extent sufficient to cause the turbine to operate at the normal and desired speed to maintain normal voltage on the generator.

A decided advantage of the present combination is that the valve 14 is closed to its greatest extent only when there is no load on the generator. This insures that, during starting of the set, there is always available at the turbine an amount of working fluid sufficient to bring the set up to normal speed independently of the load on the set during starting.

Figure 2:
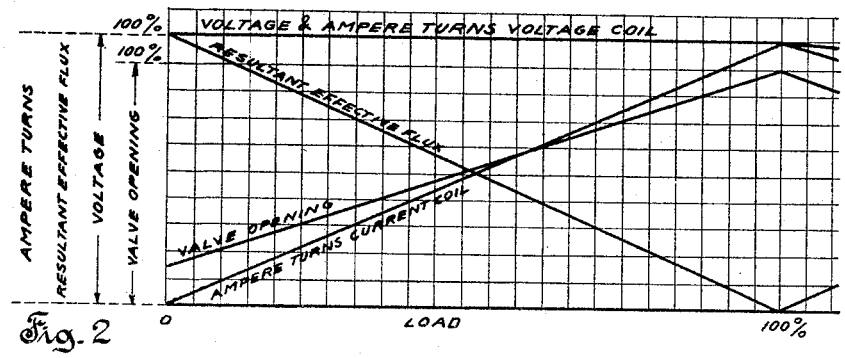
Fig. 2 is a graphic showing of the operating characteristics of the system of Fig. 1, when the set is running at normal speed.

Fig. 2 shows graphically the variation in ampere turns of the current coil 17 and the voltage coil 18, and hence the magnetizing effects due thereto and the resultant effective flux in the electromagnetic device A, and the variation in the generator voltage and the opening of the throttle valve at the turbine inlet as the load on the generator varies, with the set running at normal speed.

Figure 3:
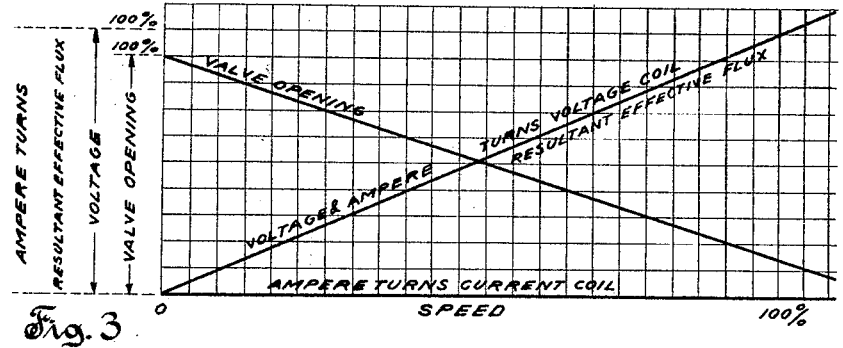
Figs. 3, 4 and 5 are graphic showings of operating characteristics of the system of Fig. 1, when starting under no-load, half-load and full-load, respectively.

Fig. 3 shows graphically the variation in ampere turns of the energizing coils 17 and 18 and the resultant effective flux, and the generator voltage and throttle valve opening as the set is started, with no load on the generator.

Figure 4:
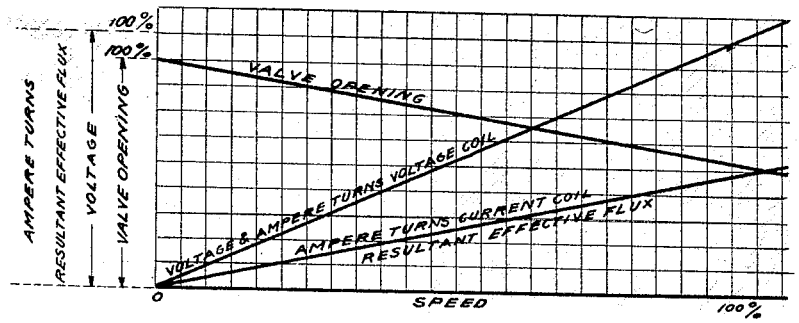

Fig. 4 shows graphically the characteristics of the set during starting, with one-half normal load on the generator.

Figure 5:
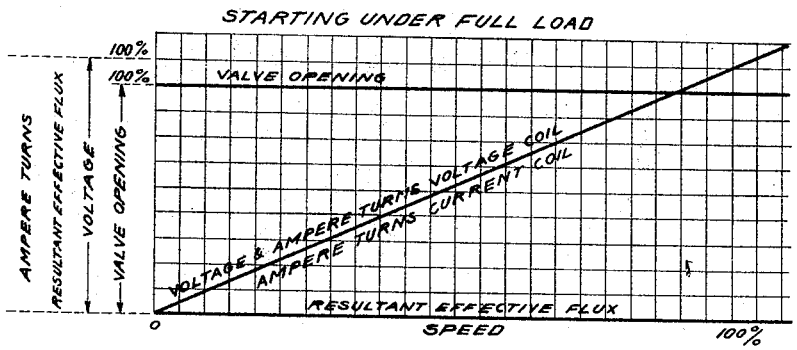

Fig. 5 shows graphically the characteristics of the set during starting, with full or normal load on the generator.

From a consideration of the graphs of Figs. 2, 3, 4 and 5, it will be seen that the throttle valve will always remain open to an extent which insures a maximum degree of acceleration under all conditions of generator load. Again, as indicated by the extreme right hand portions of the curves of Fig. 2, an increase of the load appreciably above normal, as in the case of a short circuit, is effective to cause the current coil to predominate to an increasing degree and cause closure of the valve 14, with consequent decrease of speed and voltage, thus bringing the current down to a value which may not be harmful to the apparatus.

Figure 6:
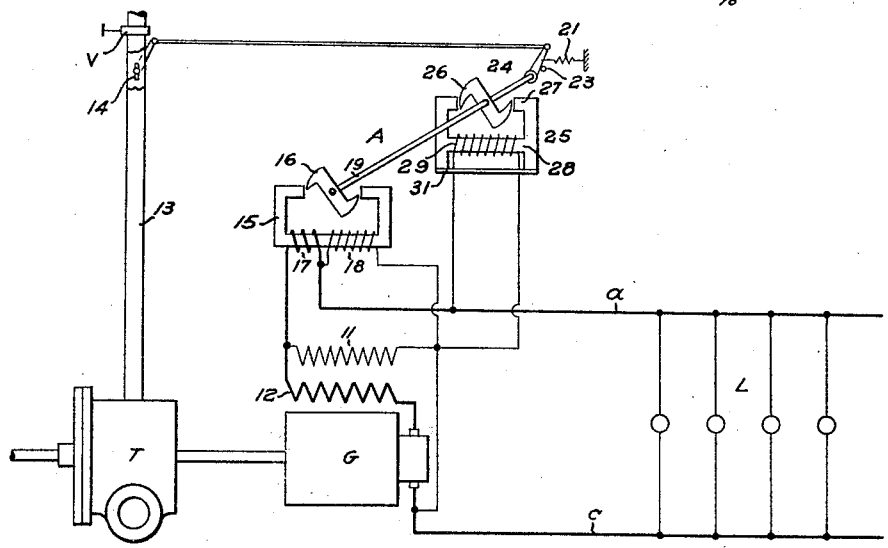
Fig. 6 is a diagrammatic view showing a modification of the system of Fig. 1.

In the modified system of Fig. 6, a refinement has been added which takes care of any excess voltage due to an increase in the pressure of the working fluid above normal at the turbine inlet. An electromagnetic device 24 includes a stationary magnetizable element 25 and a movable element 26 similar to the movable element 16 and co-operative with polar portions of one path 27 through the stationary element. The flux producing part 28 of the stationary element is provided with a magnetizing winding 29 connected across the terminals of the generator and carrying current responsive to the voltage thereof. An auxiliary magnetic path 31 of reduced cross-sectional area is in parallel to the path 27. The dimensions of the path 31 are such that the latter becomes magnetically saturated when the voltage of the generator is normal. Up to this time, the flux produced by the winding 29 is ineffective to produce sufficient torque upon the movable element 26 to cause actuation thereof, due to the fact that the magnetic reluctance of the path 27 is much greater than that of the path 31, and hence substantially the entire flux passes through this path 31.

The movable element 26 is secured to the shaft 19, and any flux passing through the element 26 and the polar pieces of path 27 is effective to exert a turning moment on the shaft 19 in a direction corresponding to closure of the throttle valve 14. By proper design of this electromagnetic device 24, no appreciable torque is exercised upon the shaft 19 while the speed and, hence, the voltage of the generator is normal, and an excess voltage is effective to exert an additional torque, dependent upon the magnitude of the voltage, on the shaft 19, which, at least, insures limiting the speed and consequent voltage to one that the translating devices on the distribution circuit can safely stand, and this regulating or controlling effect in response to excess voltage is exercised independently of the load on the generator.

It will be apparent that in accordance with this invention, a distribution system is provided wherein the prime mover driving the generator which supplies a variable electrical load is caused to maintain a substantially constant speed and, hence, a substantially constant voltage on the generator independently of the electrical load on the generator, and this while insuring that the set may readily be brought up to normal speed independently of the amount of electrical load on the generator at the time. The feature of controlling the machines in response to joint effects of the current and voltage under certain conditions of operation and in further response to effects of voltage alone under other conditions of operation, is being more generically claimed in applicant's copending application Ser. No. 42,104, filed July 24, 1915.

It should be understood that it is not desired that the invention claimed be limited to the exact details of construction or to use in the particular embodiment or form shown and described, for obvious modifications and other uses will occur to a person skilled in the art.

It is claimed and desired to secure by Letters Patent:

1. In combination, a turbo-generator set, a variable load connected to be supplied by the generator of said set, and means for controlling the power of said turbine automatically in response to the electrical load on said generator, said means being differentially responsive to the current and voltage of said generator and additionally responsive to variations of said voltage above normal.

2. In combination, an engine, a generator driven thereby, a variable electrical load connected to be supplied by said generator, and electromagnetically-actuated means for controlling said generator, said means comprising a magnetic field element and a plurality of differentially arranged energizing windings therefor, one of said windings being responsive to the current and another of said windings being responsive to the voltage of said generator, said means being additionally responsive to variations of said voltage above normal.

3. In combination, an engine, a generator driven thereby and connected to supply a variable load, and means for controlling the speed of said generator automatically in response to characteristics of the electrical load on said generator, said means comprising a plurality of electromagnetically-actuated devices, one of said devices being operable in response to differential effects of the current and voltage of said generator and the other of said devices being operable only in response to variations in excess voltage of said generator, and a throttle element for said engine under the joint control of both of said devices.

4. In combination, an engine, a generator driven thereby and connected to supply a variable load, and means for controlling the speed of said engine and comprising a unitarily operable, electromagnetically-actuated apparatus energized by differentially arranged voltage and current windings, and a second voltage winding, the latter voltage winding exercising its controlling effect only in response to excess voltage.

5. In combination, a prime mover, a generator driven thereby and connectible to supply a variable load, and means for controlling the speed and voltage of said generator, said controlling means comprising electromagnetically-actuated instrumentalities operative to control the supply of motive fluid to said prime mover, said instrumentalities being responsive to differential effects of the current and voltage of said generator and being further responsive to the effect of excess voltage alone.

6. In combination, a generator, and means for controlling a characteristic of the current in the circuit of said generator, said controlling means comprising electromagnetically-actuated instrumentalities responsive to differential effects of the current and voltage of the generator circuit and further responsive to the effect of excess voltage alone independently of the current in said circuit.

7. In combination, an engine, a generator driven thereby, and means for controlling a characteristic of the current in the circuit of said generator, said controlling means comprising a device for regulating the supply of motive fluid to said engine, and electromagnetically-actuated instrumentalities for operating said regulating device, said instrumentalities being responsive to the load on said generator while the voltage thereof substantially remains at a predetermined normal value and being further responsive to the effects of excess voltage independently of the load on the generator.

8. In combination, an engine, a generator adapted to be driven thereby, a variable electrical load adapted to be supplied by said generator, and means for controlling said generator, said means including instrumentalities responsive to the load on said generator while the voltage thereon substantially remains at a predetermined normal value, and means responsive to the occurrence of voltage in excess of said normal value independently of the value of the load on said generator for exercising a controlling effect upon the throttle of said engine.

9. In combination, an engine, a generator driven thereby, a variable electrical load adapted to be supplied by said generator, and means for controlling the power of said engine, said means comprising an electromagnetically-actuated device including relatively rotatable field and armature elements, and a controlling element actuatable thereby in response to the load on the generator circuit under conditions of normal voltage thereon, and additionally in response to excess speed of said generator.

10. In combination, an engine, a generator driven thereby and connected to supply a variable load, and means for controlling the speed of said engine, said controlling means comprising electromagnetically-actuated instrumentalities responsive to differential effects of current and voltage in the circuit of said generator and to the effect of excess voltage independently of said current.

In testimony whereof, the signature of the inventor is affixed hereto.

JOHN J. KANE.